United States Patent [19]

Menigat

[11] 3,736,886
[45] June 5, 1973

[54] METHOD OF AND APPARATUS FOR THE COMBUSTION OF SLUDGE

[75] Inventor: Richard Menigat, 6051 Dietzenbach, Germany

[73] Assignee: Metallgesellschaft Aktiengesellschaft, Frankfurt/Main, Germany

[22] Filed: July 19, 1971

[21] Appl. No.: 163,905

[30] Foreign Application Priority Data

July 29, 1970 Germany.....................P 20 37 560.4

[52] U.S. Cl. .......................110/7 R, 110/8 R, 110/15
[51] Int. Cl................................................F23g 5/00
[58] Field of Search ........................110/8 R, 7 R, 12, 110/15

[56] References Cited

UNITED STATES PATENTS 3,319,587  5/1967  Albertson et al..........................110/8
3,592,149  7/1971  Mutke et al. .............................110/8
3,587,488  6/1971  Mutke et al. .............................110/8
3,411,465  11/1968  Shirai......................................110/12
3,306,236  2/1967  Campbell.................................110/8

*Primary Examiner*—Kenneth W. Sprague
*Attorney*—Karl F. Ross

[57] ABSTRACT

A method of and an apparatus for the combustion of sludge wherein the sludge is caused to fall freely through a fluidized-bed chamber from above through at least a sufficient distance to permit volatile components to be released by the cascading sludge and afterburning of these volatile components. The exhaust gases are removed at least three meters above the sludge inlet to the chamber.

10 Claims, 2 Drawing Figures

PATENTED JUN 5 1973

Inventor:
Richard Menigat
by Karl G. Ross
Attorney

METHOD OF AND APPARATUS FOR THE COMBUSTION OF SLUDGE

FIELD OF THE INVENTION

My present invention relates to a process for the burning of sludge and, more particularly, to a method of and an apparatus for the combustion of water-treatment and waste-treatment sludge.

BACKGROUND OF THE INVENTION

In the treatment of water or sewage containing organic matter or industrial waste, it is a common practice to generate a sludge which is sedimented from the water or from which clear water is decanted. In many cases, the sludge is active in that it promotes the degradation of organic components in the influent and increases the purity of the affluent. Domestic, municipal or industrial sewage treatment and some water treatment processes result, therefore, in so-called "clarifier sludges" which are a by-product of the process and must be disposed of.

Several systems have been proposed for the disposal of clarifier sludge, including simple discharge into bodies of water or landfill areas, both of these methods being characterized by environmental pollution, and are avoided because of the danger to the environment. Methods of drying and using the clarifier sludges for fertilizer and of incorporating the clarifier sludge in industrial products have been proposed, but have not succeeded in eliminating the problem.

A significant system for disposing of clarifier sludge is the combustion thereof, a process which has encountered manifold difficulties because the clarifier sludges are available in consistencies varying from a thin liquid through a thick but flowable liquid, to a substantially non-flowable paste. It is obvious that any given sludge combustion apparatus may encounter difficulties when charged with sludge of varying consistencies.

In order to ameliorate this problem, it has generally been required to dewater the sludge in filters or centrifuges, or on drying beds, downstream of the settling tanks and prior to introduction of a dewatered sludge into a combustion apparatus. The system is complicated by the high cost of the dewatering means, the fact that operating personnel may be exposed to the noxious material, and that the process is noisome to the environment in which it is carried out. Efforts to make the process sanitary have not been fully successful.

Multiple-hearth furnaces, belt and grate systems and the like have also been proposed in connection with the combustion of clarifier sludge, but none of these methods or devices have proved to be entirely satisfactory.

OBJECTS OF THE INVENTION

It is, therefore, the principal object of the present invention to provide an improved method of burning clarifier sludges of the character described so as to obviate the disadvantages mentioned earlier.

Another object of the invention is to provide a method of burning sludge which is capable of increasing the capacity of furnaces for this purpose while nevertheless insuring a compact construction thereof.

Still another object of the invention is to provide a sludge-combustion apparatus of compact construction, high capacity and good efficiency, which is free from the drawbacks of earlier systems as enumerated above.

SUMMARY OF THE INVENTION

These objects and others which will become apparent hereinafter are attained, in accordance with the present invention, with a system based upon my discovery that it is possible to vastly increase the efficiency of a fluidized-bed furnace for the combustion of sludge, especially a furnace operating with an expanded fluidized bed, in which a distillation of sludge is permitted in cascade or free fall onto the bed and an afterburning of the volatile components of the sludge is performed above the inlet of the latter but within the fluidized-bed chamber.

According to an important feature of the present invention, therefore, the clarifier sludge is supplied to a fluidized-bed furnace in the form of a liquid, paste or solid (generally a semisolid or a flowable solid), in which a fluidized bed is maintained in a burning state with the aid of oxygen-containing fluidizing gases. At least a portion of the sludge (or other waste to be burnt) is introduced into the chamber at a point above the highest combustion zone of the expanded fluidized bed (i.e., above the flame at the top of the fluidized bed), the point at which the sludge is fed to the furnace being disposed below or at a sufficient spacing from the exhaust gas outlet, that within the fluidized bed chamber, there is effected an afterburning of volatile constituents of the sludge. Surprisingly, the simple free fall or cascade of the sludge, or a portion thereof, to the expanded fluidized bed from above may result in a distillation of volatile constituents regardless of the original consistency of the sludge, these volatile constituents interacting with the gases rising from the fluidized bed to provide the afterburning mentioned earlier. The fact that afterburning is carried out completely within the fluidized-bed chamber and between the inlet for the sludge and the gas outlet, provides maximum utilization of the heat value of the materials.

According to another important feature of this invention, only a portion of the sludge is supplied to the expanded bed by the cascade through the combustion chamber, the remainder being supplied at a point adjacent the fluidized bed. The portion delivered to the fluidized bed directly will hereinafter be identified as the primary influent, whereas the portion introduced above the fluidized bed and subjected to destructive distillation and drying is referred to as the secondary influent.

The supply of a secondary stream of waste, as is essential for the purposes of the present invention, is effective in increasing the combustion capacity of the fluidized bed in terms of the gas of waste burnt per unit area of the fluidized-bed grate and per unit time, only in that the height through which the waste falls until it reaches the top of the expanded fluidized bed is sufficient for a substantial predrying of the waste and at least a partial distillation or carbonization thereof: the gas space above the feeding point must be sufficient to permit of an afterburning of volatile combustible substances formed during the free fall passage of the waste. The added distance for afterburning may be achieved by providing a space above the inlet duct of at least three meters prior to the exhaust gas outlet. In other words, the secondary stream of waste is fed into the furnace at a point which is at least three meters below the exhaust gas outlet at the top of the furnace chamber.

Furthermore, I have discovered that, when the temperature is maintained at 800° C or above the exhaust gas outlet, a quantitative combustion of the combustible gas components is ensured and exhaust gases which are discharged from the furnace are free from the noisome odors characterizing earlier sludge combustion systems. Furthermore, the velocity of the gas at the top of the furnace should not exceed three meters per second if quantitative combustion is to be carried out.

Yet another feature of the invention resides in carrying out the process and operating the apparatus under superatmospheric pressure, whereby an induced-draft apparatus can be avoided. Exhaust gas formed during the combustion process may be cooled and/or purified immediately after the gas is released from the combustion chamber.

DESCRIPTION OF THE DRAWING

The above and other objects, features and advantages of the present invention will become more readily apparent from the following description reference being made to the accompanying drawing in which.

SPECIFIC DESCRIPTION AND EXAMPLE

Figure 1:
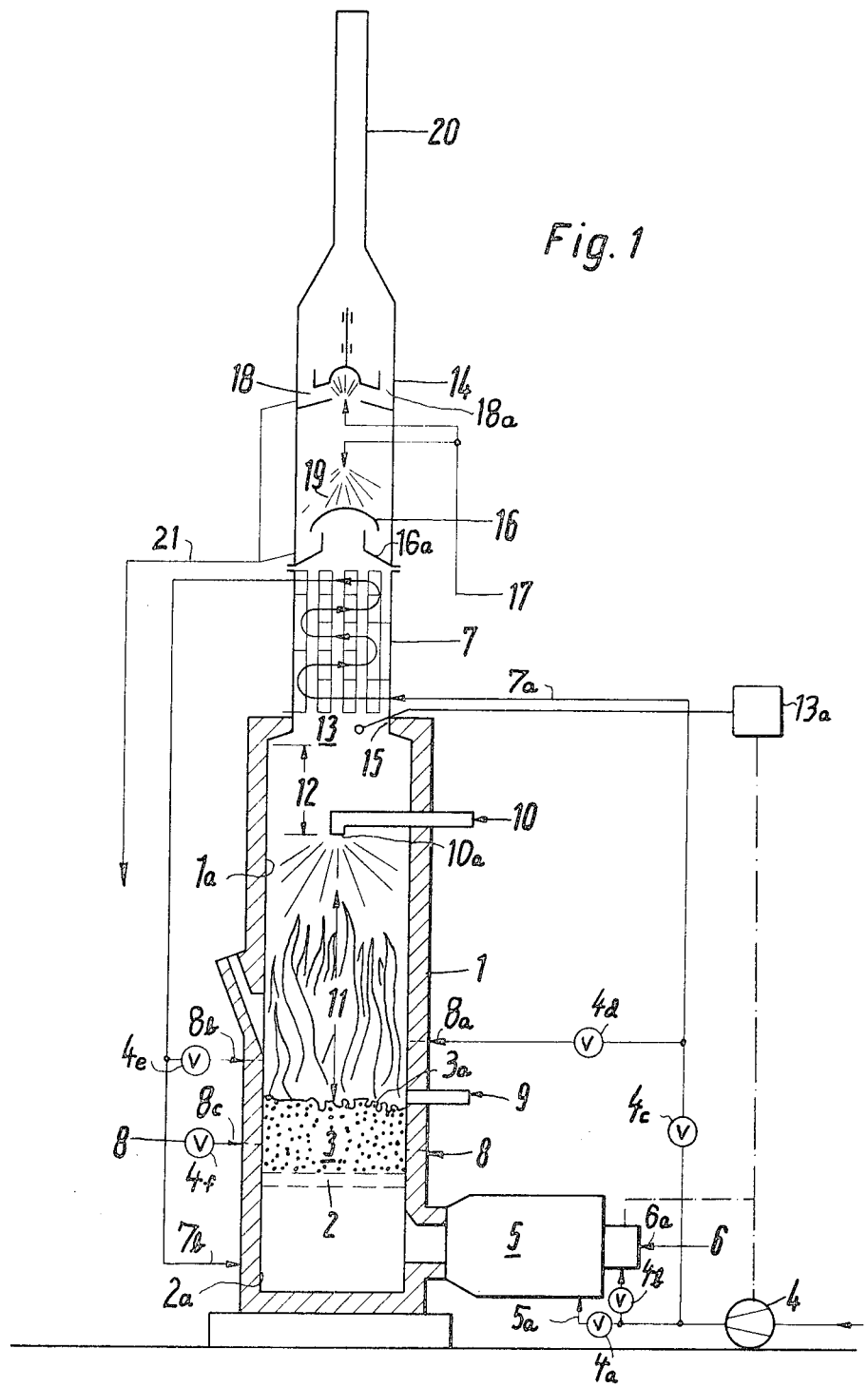
FIG. 1 is a vertical cross-sectional view, partly in diagrammatic form, of an apparatus for carrying out the process of the present invention.

The fluidized bed furnace illustrated in FIG. 1 comprises a refractory-lined, steel-encased shaft 1 provided with a grate 2 defining the bottom of a fluidized-bed chamber 1a. Above the grate 2 there is maintained an expanded fluidized bed 3 of inert fluidized solids, e.g., quartz sand, at which combustion of volatile components of a sludge and burnable solids is carried out. Below the grate 2, there is formed a windowbox 2a into which an oxygen-containing fluidizing-gas stream is introduced from a combustion chamber 5. The latter may be fed with atmospheric air from a compressor or blower 4 through an inlet 5a when only air is to be introduced or when air is to be supplied to the fluidized bed in combination with combustion gases. A valve 4a controls the proportion of air supplied for this purpose. Another valve 4b controls the air supplied to a burner 6 opening into the combustion chamber 5 and supplied with fuel at a line 6a. The fuel introduced at 6a may be gas or oil. It will be apparent that heat can be supplied to the fluidized bed by sustaining combustion in chamber 5 and introducing a mixture of hot combustion gases and air to the fluidized bed. At any rate the fluidizing gas must be rich in oxygen or must contain oxygen in a stoichiometric excess over any combustible materials introduced by the fluidizing gas. Another portion of the fluidizing air, controlled by a valve 4c may be fed at 7a through a heat exchanger 7 and returned at 7b to the windowbox 2a. The heat exchanger 7 is located above the gas outlet 13 at the upper end of the combustion chamber 1a.

It has been found to be advantageous, from time to time, to introduce unheated air or oxygen-enriched air to the combustion chamber above the fluidized bed or into the fluidized bed by lances represented at 8a, 8b and 8c, the latter lances serving to supply preheated air to the system. The gases distributed to these lances via supply lines 8 through valves are represented at 4d, 4e and 4f. Fuel may be introduced through the lances 8c and 8d as well. Spaced above the top 3a of the fluidized bed, which is maintained approximately in line with the primary sludge inlet 9, by a distance 11, is the secondary sludge inlet 10. In the embodiment illustrated and in a specific Example of the present invention, which is given in greater detail below, the inlet 10 is located six meters above the grate and about 4.5m above the fluidized bed which may have a high ranging between 1 and 1.5m. The pipe 10, moreover, should be located somewhat above (say 0.5 to 1m), the top of the combustion zone. Above the pipe 10, at least at its mouth 10a, there is located the exhaust-gas outlet 13 at a spacing of at least three meters and represented by the dimension 12. Within this afterburning zone, the gas velocity is maintained at or below 3m/second. A temperature control 13a at the outlet regulates the operating parameters of the burner and gas feed to maintain the exhaust gas temperature in the range of 800° C to 900° C.

The hot exhaust gases discharged through the outlet 13 pass at 15 into the heat exchanger 7 in which sensible heat is transferred to gases which are used to feed the bed. Thereafter, the exhaust gases traverse a scrubber 14, e.g., a radial flow scrubber as shown in FIG. 1, and then enter a chimney or stack 20 which is advantageously mounted directly upon the furnace. Water is sprayed into the scrubber as shown at 17, 18 and 19 and a shield is provided at 16 of the bell type. The shield 16 cooperates with a cone 16a and an annular gap 18a is provided at the scrubber 18 for additional separation of impurities. The shield 16 and the gap 18a are designed so that the scrubbing water is properly drained at 21 with the resulting seals acting as an explosion vent. The annular gap 18a is adjusted in response to pressure differential to maintain a superatmospheric pressure within the combustion chamber and insure a constant scrubbing effect even when the combustion rate and the exhaust gas rate vary. The scrubbing of the exhaust gas effectively removes sulphur trioxide and hydrogen chloride where alkaline scrubbing water is employed.

As a specific example of the invention, with the outlet 10a located 3 meters below the gas outlet 15 but 6 meters above the grate 2, with a fluidized bed of quartz sand maintained at a height of about 1.5m and a gap of one meter between the top of the combustion zone and the secondary waste inlet 10a, I maintain the temperature at the gas outlet 15 at about 800° to 900° C. The system is used to burn refinery sludge consisting of 95 percent by weight water and 5 percent oil and industrial solids. Without a secondary combustion as illustrated, 300 to 500 kg of refinery sludge could be processed per hour per square meter of the grate area. Using a secondary flow of 30 to 60 percent of the total flow, it was possible to increase the combustion rate to 600 – 1000 kg of sludge per hour per square meter of the grate area. The fluidizing air is heated to a temperature of 450° to 600° C and I control the temperature to maintain a level of 800° to 900° C at outlet 13 by feeding fuel into the system at the lances 8c and 8d.

Figure 2:
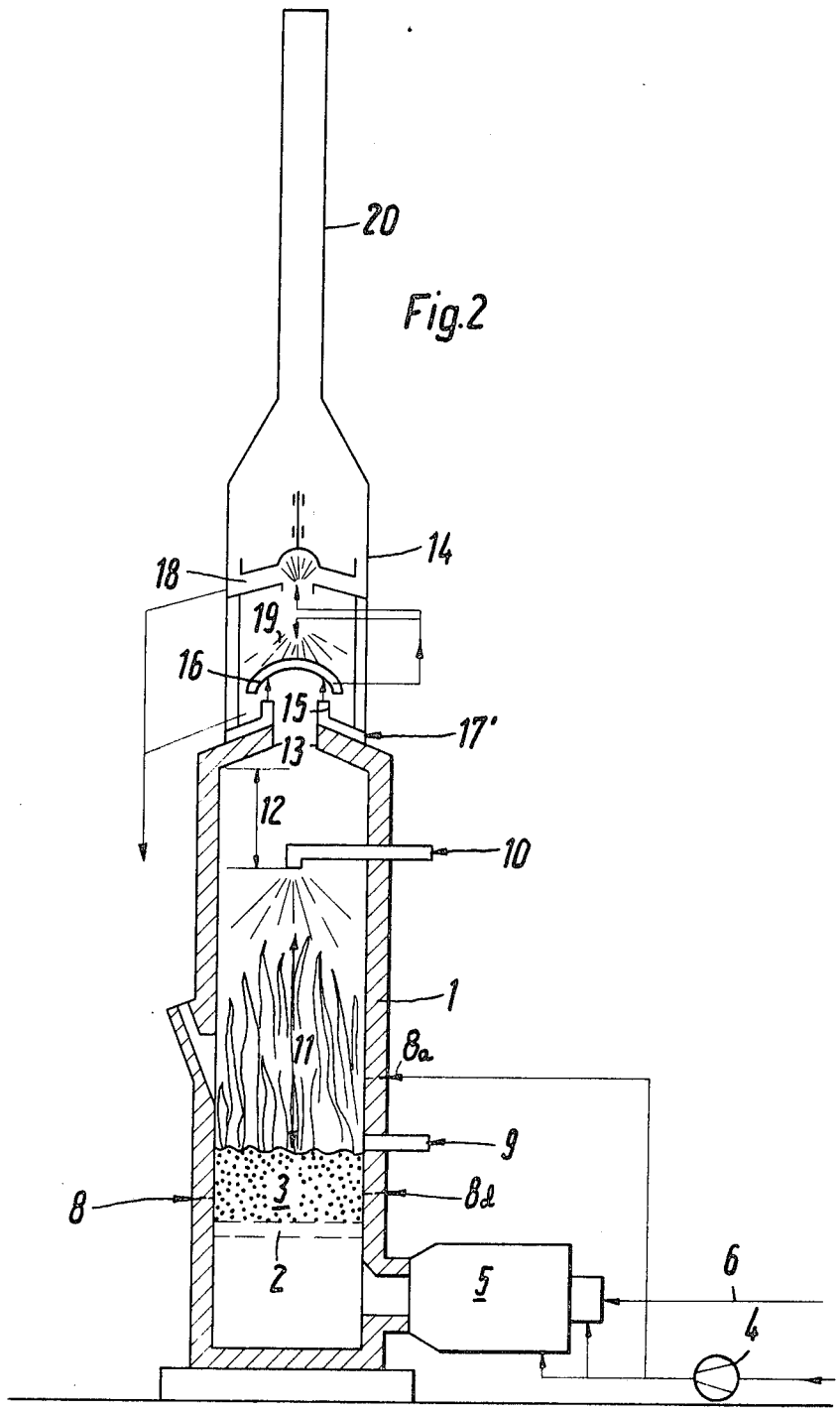
FIG. 2 is a view similar to FIG. 1 of another embodiment of the invention.

In the system of FIG. 2, in which identical numerals identify identical structure, no exhaust gas heat exchanger is provided and the water for scrubbing is passed through the duct 17' for cooling the outlet 15 and the shield 16 before it is admitted to the cooling and scrubbing stages. The cooling zone 19 should, in this case, be provided with a lining which resists acid and high temperatures.

I claim:

1. A method of burning a wet flowable material, especially a liquid, paste or flowable solid such as clarifier sludge, comprising the steps of:

burning a primary portion of said flowable material in a columnar fluidized bed in the presence of an oxygen-containing fluidizing gas to produce exhaust gases and create a burning zone above said fluidized bed;

cascading a secondary portion of said flowable material vertically downwardly in a column directly onto said fluidized bed from a location sufficiently above said zone to volatilize combustible constituents of said secondary portion; and burning said volatile constituents in the column directly above said bed between said location and a point at which exhaust gas is discharged from said zone.

2. The method defined in claim 1 wherein the distance between said location and said point is at least three meters.

3. The method defined in claim 1, further comprising the step of controlling the combustion of said flowable material to maintain a temperature of at least 800° C at said point.

4. The method defined in claim 1, further comprising the step of controlling the gas flow through said bed and said zone to maintain a velocity of the gas at said point of at most 3m/second.

5. The method defined in claim 1 wherein said material is burnt under superatmospheric pressure.

6. The method defined in claim 1, further comprising the steps of cooling the exhaust gas upon passage through said point above said fluidized bed and cleaning said exhaust gas.

7. A furnace for the combustion of a wet flowable waste material comprising a vertical shaft defining a column and formed at a bottom portion thereof with a grate adapted to maintain a fluidized bed thereabove; means for feeding an oxygen-containing fluidizing gas through said grate; means for introducing into said column in the region of said fluidized bed a primary stream of said flowable material, said flowable material burning in said column to form a combustion zone in said shaft; means for introducing a secondary stream of said flowable material into said shaft and in said column directly above said fluidized bed and above said zone; and means forming an exhaust gas outlet in said shaft at least three meters above said means for introducing said secondary stream.

8. The apparatus defined in claim 7, further comprising an exhaust gas cooler atop said shaft above said outlet.

9. The apparatus defined in claim 7, further comprising an exhaust gas purifier atop said shaft above said outlet.

10. The apparatus defined in claim 9, further comprising an exhaust gas cooler atop said shaft intermediate said outlet and said purifier, and control means responsive to the exhaust gas temperature at said outlet for maintaining the same between 800° C and 900° C.

* * * * *